Aug. 13, 1929.  E. W. LINCOLN  1,724,607
RECTIFIER CIRCUITS
Filed May 9, 1927
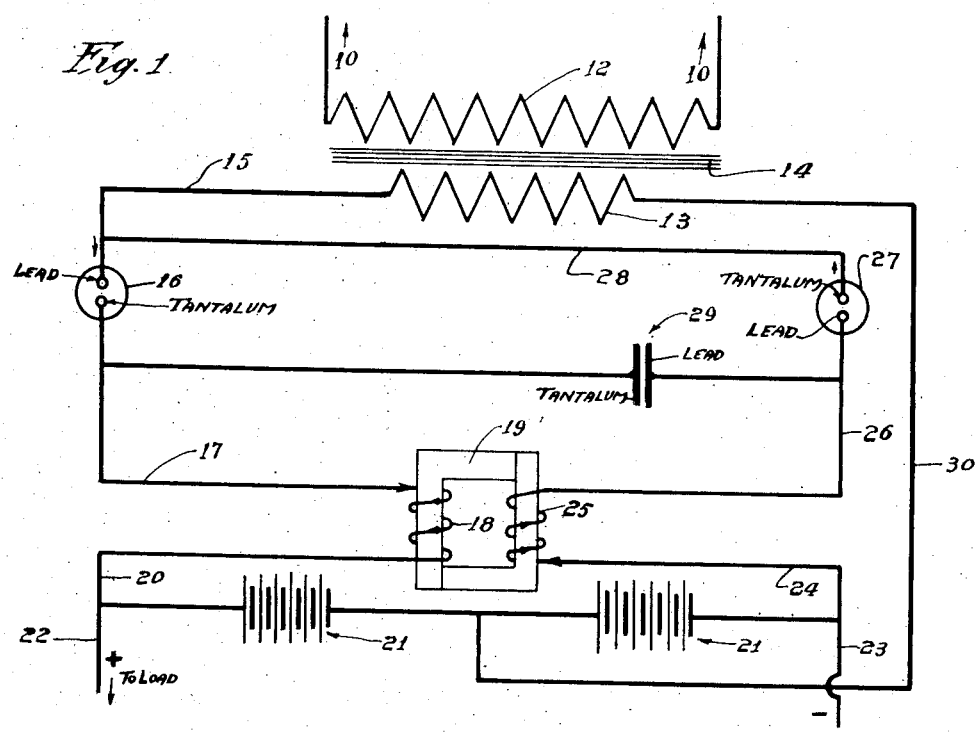
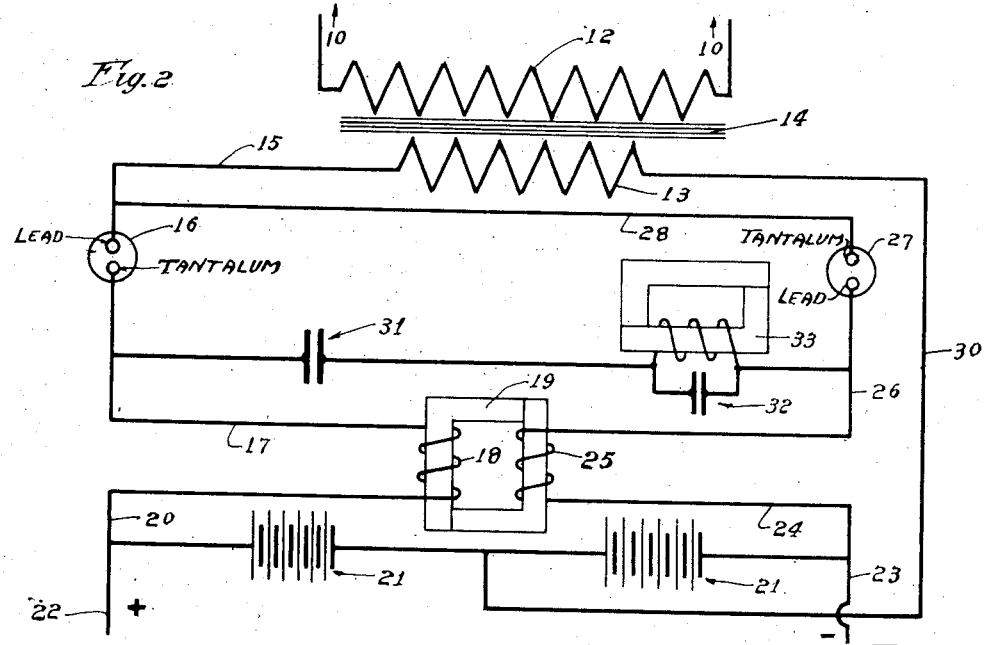
Inventor:
Elmer W. Lincoln
By:
Williams, Bradbury, McCaleb & Hinkle
Attys.

Patented Aug. 13, 1929.

1,724,607

UNITED STATES PATENT OFFICE.

ELMER W. LINCOLN, OF CHICAGO, ILLINOIS, ASSIGNOR TO FANSTEEL PRODUCTS COMPANY, INC., OF CHICAGO, ILLINOIS, A CORPORATION OF NEW YORK.

RECTIFIER CIRCUIT.

Application filed May 9, 1927. Serial No. 189,858.

This invention relates to circuits wherein alternating current is rectified to yield a direct pulsating current and the pulsating current is then smoothed out by means of a filter system.

The object of this invention is to enable alternating current to be used for telephone and radio work without causing a hum in the phones.

A further object of this invention is to smooth out pulsations in such a current by the use of two windings on a single inductance core.

Other objects will be apparent as the detailed description of my invention proceeds.

In the accompanying drawings, which represent preferred embodiments of my invention, Fig. 1 is a diagrammatic illustration of an embodiment using a unidirectional condenser bridge between positive and negative conductors, and Fig. 2 is a similar drawing in which the condenser is replaced by a smaller condenser in series with a parallel arrangement of inductance and capacity.

Alternating current is supplied from a source 10 which may be an ordinary 110 volt lighting circuit. Its voltage is stepped down by transformer 11 which comprises a primary coil 12 and a secondary coil 13 wound on a core 14. One terminal of the secondary 13 is connected to the lead terminal of an electrolytic rectifier 16 by a conductor 15. This rectifier is preferably of the type disclosed in the patent to E. W. Engle, No. 1,495,582, dated May 27, 1924, Re. October 12, 1926, as No. 16,438, and consists of a tantalum electrode and a lead electrode immersed in a sulphuric acid electrolyte to which has been added a small amount of a salt of a metal of the iron group.

The tantalum electrode of rectifier 16 is connected by conductor 17 to a winding 18 on a choke ring 19. The choke ring is preferably a laminated iron core with a cross section area of about ½ square inch, and the winding in the preferred embodiment consists of 225 turns of No. 21 wire. The other terminal of the winding is connected by a conductor 20 to the positive terminal of a lead storage battery 21. This terminal also has a conductor 22 leading to a load which may be a radio receiving set, a telephone switchboard, etc. The negative terminal of the storage battery 21 is connected by a conductor 23 to the load and by a conductor 24 to a choke coil 25 wound around the other side of the laminated choke ring 19.

The windings 18 and 25 are in such a direction that the electromagnetic lines are in the same direction; i. e., the effect of the windings is additive and they do not neutralize each other. The other terminal of the winding 25 is connected by a conductor 26 to the lead terminal of rectifier 27, the tantalum electrode of this rectifier being connected by a conductor 28 to the terminal of the secondary coil 13, referred to above.

Bridged across conductors 17 and 26 there is a unidirectional condenser 29 which is preferably of the electrolytic type.

In my preferred embodiment, I use a tantalum-lead-sulphuric acid cell in which the area of the tantalum is about 66 square inches. The tantalum is connected to conductor 17 and the lead to conductor 26, as shown in Fig. 1. The other end of the secondary 13 is connected by conductor 30 to the center of storage battery 21.

The modification shown in Fig. 2 is the same as that described above with the exception that the unidirectional condenser 29 is replaced by paper condensers 31 and 32, an inductance 33 being bridged across condenser 32, as shown in the drawing. The object of this change is to reduce the required capacity of the condensers, and with this arrangement condenser 31 may have a capacity of 15 microfarads and condenser 32 a capacity of 2 microfarads.

The operation of my invention may be described as follows:

When current is flowing counter-clockwise in the secondary circuit, the tantalum electrode of cell 27 will act as a closed valve and current will flow through 15, 16, 17, 18 and 20, the left half of the storage battery 21 and through 30 to the other side of the secondary winding. When current flows clockwise in the circuit, the tantalum electrode in cell 16 acts as a closed valve and current flows through 30, the right half of lead storage battery 21 and conductors 24, 25, 26, 27 and 28 to the opposite side of the secondary winding 13. Thus the current through 15, 17 and 20 is always flowing to the load and it may, therefore, be termed the positive side or conductor. The conductors 24, 26 and 28 permit current to flow only toward the source and for this reason they may be termed negative conductors, the terms "positive" and "negative" indicating whether the current is flowing toward the load or toward the source.

It will be noted that the left half of the storage battery is charged by one wave and the right half by the other wave of the rectified current. This feature tends to eliminate the pulsating effect in conductors 22 and 23. The use of the choke ring 19, provided with windings 18 and 25, serves to further reduce the pulsations and also to increase the charging rate.

I have found that the choke ring must be wound, as shown in the drawings, to give the desired charging rate, and that if the opposite windings are used or separate inductances are employed, the charging rate is materially lowered and the same filtering action is not obtained. The construction of the choke coil, which has two windings on a ring type core, is somewhat like a transformer, due to the fact that the charger is of the double half wave type, so that the current and voltage builds up in one winding during one charging period, which is half of a cycle, and then through the other winding, which is the other half of the cycle. When the voltage is built up by the charging rate passing through the choke coil, a counter voltage is built up in the other winding which tends to add to the voltage of the battery, and thereby gives additional voltage impressed upon the tantalum condenser, which gives a higher charge. This condition is repeated every half cycle in which case the voltage is added to the battery voltage and increases the impressed voltage upon the tantalum condenser. This condition is very evident in this type of action, as when two separate coils are used, which have complete ring type chokes, the filtering effect cannot be compared with the effect gained by the choke being constructed of one coil with the two windings.

While I have described in detail a preferred embodiment of my invention, it is understood that I do not limit myself to any particular theory of operation or to the specific details shown except as defined by the following claims.

What I claim is:

1. A rectifier circuit including rectifying means, a storage battery, connections between said rectifier means and said storage battery whereby it is charged in sections, a choke ring, windings in both conductors on said choke ring to produce an additive effect, and a condenser bridged across said conductors between the choke ring and the rectifying means.

2. In combination, a transformer including primary and secondary windings, two tantalum-lead-sulphuric acid rectifiers, a condenser, a choke ring provided with two additive windings, a storage battery and connections from one end of the secondary winding to the lead terminal of the first rectifier, from the tantalum terminal of this rectifier to the condenser and to a winding on the choke ring, from this choke winding to the positive side of the battery and to a load, from the load and the negative side of the battery to the second winding on the choke ring, from the second choke winding to the other terminal of the condenser and to the lead plate of the second rectifier, from the tantalum plate of this rectifier to the same terminal of the secondary winding, and from the other terminal of the secondary winding to the center of the storage battery.

3. In a circuit wherein two rectifiers are connected to use both half waves of an alternating current and to charge a storage battery in sections, a choke ring, a conductor from each rectifier wound about said choke ring to produce a magnetic field in the same direction, and a capacity unit bridged across the conductors between the rectifiers and the choke ring.

4. A rectifying circuit comprising a transformer secondary, a storage battery, a connection between one terminal of the secondary and the center of the storage battery, two single half-wave rectifiers, connections between unlike electrodes of said rectifiers and the other terminal of the transformer secondary, positive and negative conductors connecting the other rectifier electrodes with the positive and negative terminals of the storage battery, a choke ring, windings in said positive and negative conductors on said ring to produce flux in the same direction, and a capacity device bridging said positive and negative conductors between said rings and said rectifiers.

In witness whereof, I hereunto subscribe my name this 6th day of April, 1927.

ELMER W. LINCOLN.